United States Patent [19]

Holland et al.

[11] Patent Number: 4,852,964

[45] Date of Patent: Aug. 1, 1989

[54] FIBER OPTIC COIL CORD

[75] Inventors: John W. Holland, Countryside; Ronald J. Weiss, Addison, both of Ill.

[73] Assignee: Storm Products Co., Hinsdale, Ill.

[21] Appl. No.: 21,467

[22] Filed: Mar. 4, 1987

[51] Int. Cl.[4] .............................................. G02B 6/44
[52] U.S. Cl. .................................................. 350/96.23
[58] Field of Search ............... 350/96.15, 96.34, 96.23; 57/6

[56] References Cited

U.S. PATENT DOCUMENTS

| | | | |
|---|---|---|---|
| 4,141,622 | 2/1979 | Beal | 350/96.23 |
| 4,146,302 | 3/1979 | Jachimowicz | 350/96.23 |
| 4,169,657 | 10/1979 | Bedard | 350/96.23 |
| 4,255,018 | 3/1981 | Ulrich et al. | 350/96.29 X |
| 4,272,155 | 6/1981 | Slaughter | 350/96.23 |
| 4,374,608 | 3/1983 | Anderson | 350/96.23 |
| 4,422,889 | 12/1983 | Trezeguet et al. | 350/96.23 |
| 4,450,406 | 5/1984 | Bobb | 350/96.1 X |
| 4,525,818 | 6/1985 | Cielo et al. | 350/96.15 X |
| 4,529,262 | 7/1985 | Ashkin et al. | 350/96.15 |
| 4,552,433 | 11/1985 | Titchmarsh | 350/96.23 |
| 4,553,815 | 11/1985 | Martin | 350/96.23 |
| 4,564,263 | 1/1986 | Ueba et al. | 350/96.34 |
| 4,568,146 | 2/1986 | Ueba et al. | 350/96.34 |
| 4,572,610 | 2/1986 | Krajewski | 350/96.34 |
| 4,577,925 | 3/1986 | Winter et al. | 350/96.23 |
| 4,579,420 | 4/1986 | Winter et al. | 350/96.23 |
| 4,580,874 | 4/1986 | Winter et al. | 350/96.21 |
| 4,585,306 | 4/1986 | Ohmori et al. | 350/96.34 |
| 4,609,871 | 9/1986 | Bobb | 350/96.29 X |

FOREIGN PATENT DOCUMENTS

| | | | |
|---|---|---|---|
| 2948853 | 1/1981 | Fed. Rep. of Germany | 350/96.23 |
| 61-04009 | 1/1986 | Japan | 350/96.23 |
| 61-26012 | 2/1986 | Japan | 350/96.23 |

OTHER PUBLICATIONS

Corguide Optical Waveguide Technical Report TR-53-/Feb., 1986, "Polarization-Retaining Single-Mode Fiber With Improved Coil Performance", by P. E. Blaszyk, R. M. Hawl, and M. J. Marrone, (Corning Glass Works, Corning, N.Y.).
Corguide Optical Waveguide Technical Report TR-46-/Jun. 1985, "Low-Loss Dispersion Shifted Single-Mode Fiber Manufactured by the OVD Process", by T. D. Croft, J. E. Ritter and V. A. Bhagavatula (Corning Glass Works, Corning, N.Y.).
Corguide Optical Waveguide Technical Report TR-47-/Jun. 1985, "Bend Optimized Dispersion-Shifted Single Mode Designs", by V. A. Bhagavtula, J. E. Ritter and R. A. Modavis, (Corning Glass Works, Corning, N.Y.).
Corguide Optical Waveguide Product Information SMF/DS Optical Waveguide Corning Product 1524, Feb., 1986, (Corning Glass Works, Corning, N.Y.

Primary Examiner—Frank Gonzalez
Assistant Examiner—John Ngo
Attorney, Agent, or Firm—Welsh & Katz, Ltd.

[57] ABSTRACT

A coiled fiber optic cable comprises an optical fiber of glass or plastic that is disposed loosely within a buffer tube. The buffer tube in turn is surrounded with a plastic strength member that is then jacketed in a thermoplastic cover. The assembled cable is wound on a mandrel in a closed helix and is heated to set the helical shape in the plastic member. After cooling, the spiral may be reverse wound to set the coiled configuration. The optical fiber may be single-mode or multimode and it may be graded-index clad or step-index clad. The coiled cable can be terminated to interconnect optical components. If the optical fiber is a single-mode fiber that is not treated to reduce internal reflections when it is bent, then the attenuation of the optical signal will be found to be an inverse function of the extension of the coiled cable. This makes it possible to use coiled single-mode fiber as an optical attenuator in a mechanical apparatus that supports the coiled fiber and provides repeatable positioning to obtain a predetermined value of optical attenuation.

21 Claims, 2 Drawing Sheets

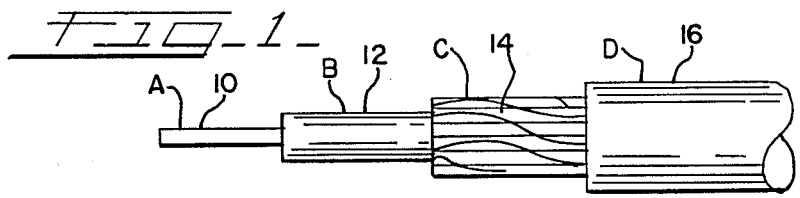
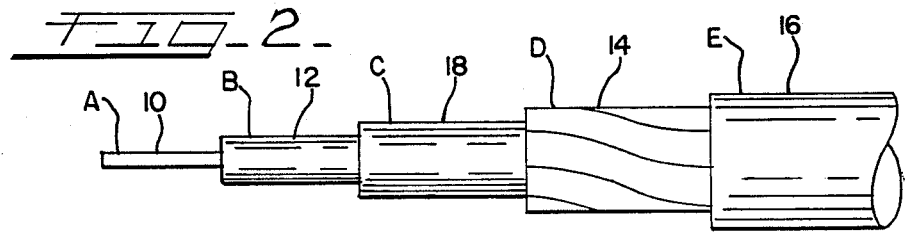
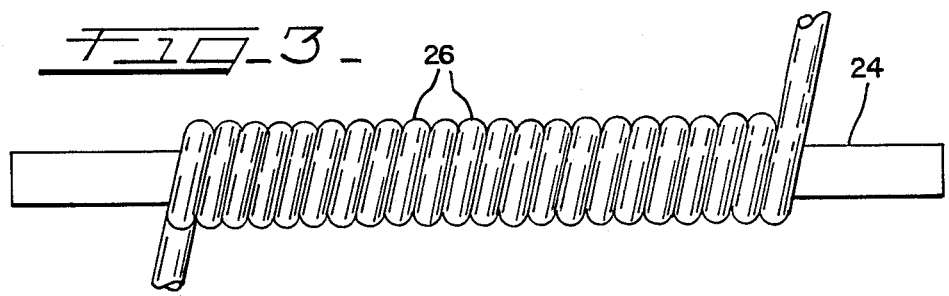
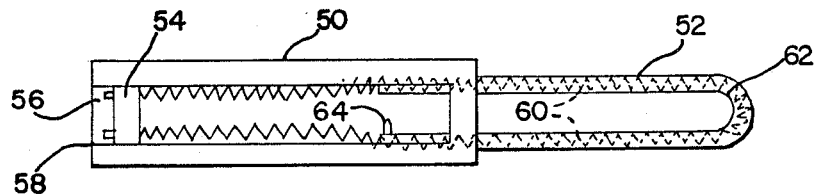
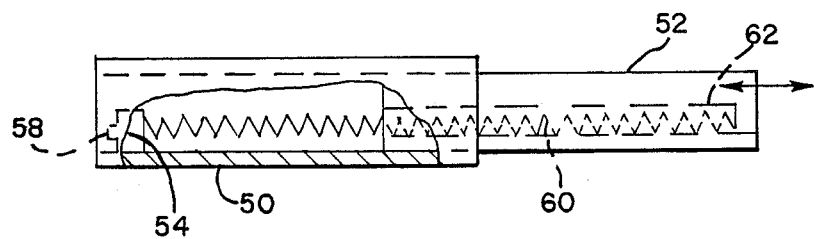

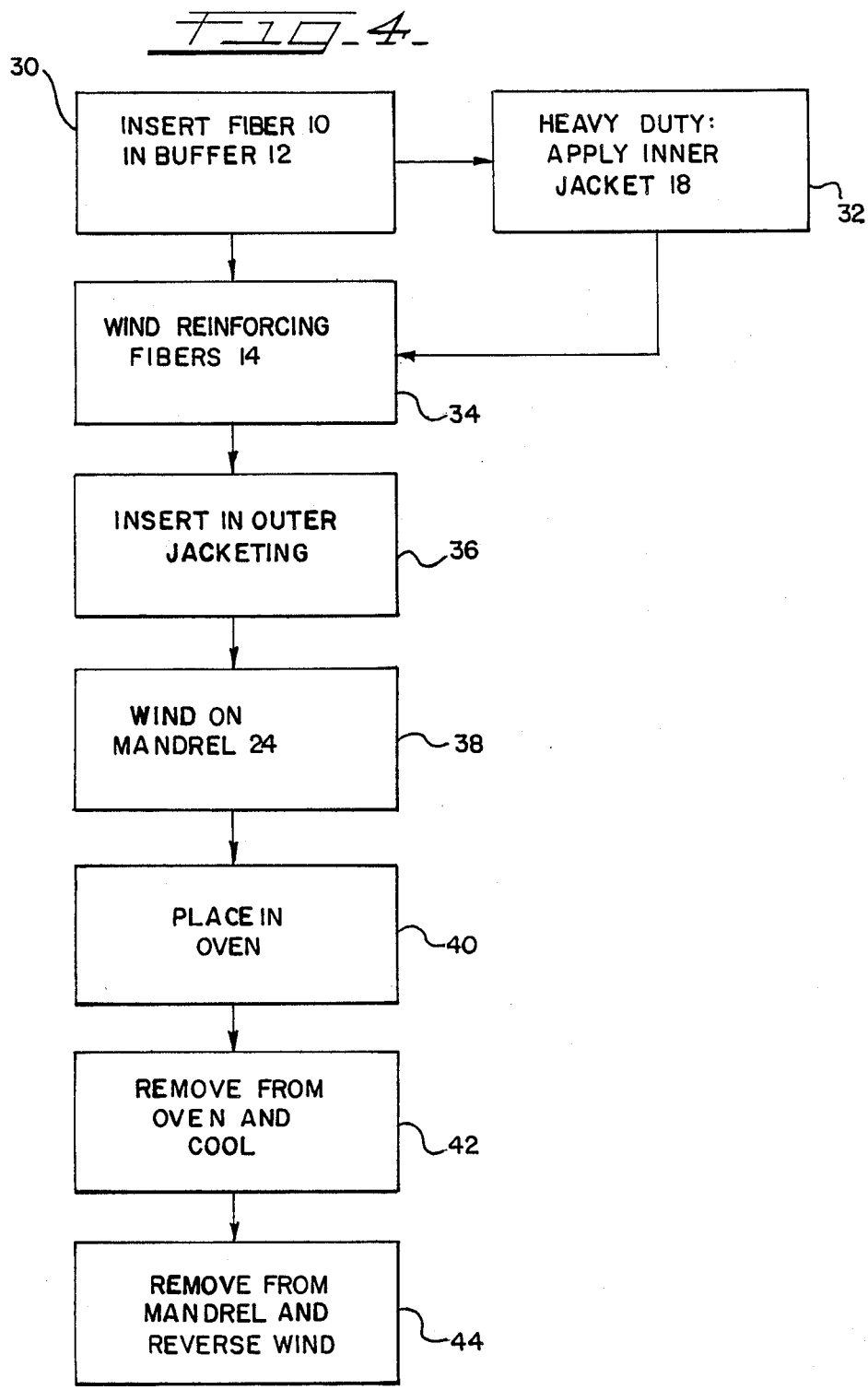

FIBER OPTIC COIL CORD

BACKGROUND OF THE INVENTION

This invention relates to fiber optic devices. In particular, the invention relates to a fiber optic connecting cable that is coiled to provide for increasing and decreasing the length of the cable.

There are many applications in which it is useful to have a fiber optic cable connecting to fiber optic devices that are movable with respect to one another. This may be true, for example, with a robot that is controlled by fiber optics, in which case it may be desirable to connect a moving part of the robot to another moving part or to a fixed location. It is also useful to be able to interconnect items of fiber optic laboratory or test equipment by cables that eliminate the need for precise spacing of the equipment. However, when conventional fiber optic cables are used for these or other similar applications, the use of enough cable to minimize the risk of breakage in a position of extreme separation is likely to lead to a cable that will sag when the interconnected parts or equipment are placed are closer together. It would be of great utility to have a fiber optic cable that would assume a range of lengths without sagging and have good stability and strength.

Two basic modes of transmission of optical information are used in optical fibers: single-mode and multi-mode. Single-mode transmission of light in an optical fiber is used when it is necessary to preserve phase information of the light. The term "single-mode" refers to the fact that little or no reflection of light within the fibers is permitted. In multi-mode transmission, on the other hand, where relative phase information is not important, the principal means of light transmission through a fiber is by multiple internal reflections from the walls of the fiber. Both single-mode and multi-mode fibers are normally produced with an internal fiber of either silica glass or a transparent plastic of a uniform index of refraction. Either kind of fiber is coated in the process of manufacture with a material that has an index of refraction that is different from and generally less than that of the main conducting fiber. If the index of refraction of the fiber is uniform, this is referred to as a step-index cladding. If the index of refraction of the fiber varies continuously from a maximum value on and near the axis to the value of the cladding at their interfaces, this is referred to as a graded index fiber. The cladding causes light that is directed at an angle to the axis of the fiber to be refracted back toward the axis.

In making fiber optic cables in the past, much effort has gone into protecting the optical fibers from breaking due to tension or kinking. To protect the fibers in tension, methods have been used such as supplying steel as a tension member and winding the optical fiber about the steel. This tends to lead to a cable that is relatively inflexible and disproportionately heavy for use in supplying optical connection to a moving part.

Therefore, there is a need for a fiber optic connecting cable that is relatively lightweight, is coiled, and can be stretched without objectable sagging and compressed without unwanted breakage of the optic fiber or fibers.

SUMMARY OF THE INVENTION

Hence, it is an object of the present invention to provide a better fiber optic cable.

It is a further object of the present invention to provide a fiber optic cable that is extensible in length.

It is a further object of the present invention to provide a coiled fiber optic cable to facilitate interconnection of optical components.

It is a further object of the present invention to provide a coiled fiber optic cable to facilitate interconnection between moving components.

It is a further object of the present invention to provide a fiber optic cable that comprises a variable optical attenuator.

Other objects will become apparent in the course of a detailed description of the invention.

A coiled fiber optic cable comprises an optical fiber of glass or plastic that is disposed within a buffer tube. The buffer tube in turn is surrounded with a plastic strength member of Kevlar or the like that is then jacketed in a thermoplastic cover. The assembled cable is wound on a mandrel in a closed helix and is heated to set the helical shape in the plastic. After cooling the spiral may be reverse wound to set the coiled configuration. The optical fiber may be single-mode or multi-mode and it may be graded-index or step-index. The coiled cable can be terminated to interconnect optical components. If the optical fiber is a single-mode fiber and if the fiber is not treated to reduce internal reflections when it is bent, then the attenuation of the optical signal will be found to be an inverse function of the extension of the coiled cable. This makes it possible to use coiled single-mode fiber as an optical attenuator.

BRIEF DESCRIPTION OF THE DRAWINGS

FIG. 1 is a view of a general purpose cable for the practice of the present invention.

FIG. 2 is a view of a heavy-duty cable for the practice of the present invention.

FIG. 3 is a perspective view showing the cable of FIG. 1 or FIG. 2 wound on a mandrel.

FIG. 4 is a flow chart of the steps necessary to prepare the coiled cable of the present invention.

FIG. 5 is a top view of an apparatus for using the coiled cable of the present invention as an optical attenuator.

DETAILED DESCRIPTION OF THE PREFERRED EMBODIMENT

FIG. 1 is a side view of a section of cable that is stripped back to show the components. In FIG. 1 fiber 10 is an optical fiber that may be single-mode or multi-mode. If multimode, it may be silica glass or plastic; if single-mode, it will normally be silica glass, either a standard optical fiber, a polarization-retaining single-mode (PRSM) fiber or a DS (dispersion shifted) fiber. In either case the fiber is normally clad, with a glass or plastic of lower refractive index of the order of 5 mils (125 microns). Single-mode fiber without cladding typically has a diameter of the order of 8.7 microns. Fiber 10 is threaded into buffer tube 12 which is a hollow plastic tube selected to have an internal diameter slightly larger than the diameter of fiber 10, to permit fiber 10 to slide easily with respect to buffer tube 12. Buffer tube 12 should also be capable of taking a permanent set when heated. One example of such a plastic is a polyester sold under the trademark Hytrel, manufactured by the duPont Company.

Structural support against excessive elongation of the cable that might damage fiber 10 is provided by reinforcing fibers 14. Typically from four to six fibers 14 are wound in an open spiral to provide longitudinal strength. One material that is satisfactory for reinforcing fibers 14 is a polyamide plastic such as one sold under the trademark Kevlar, manufactured by the duPont Company. Reinforcing fibers 14 in turn are covered with outer jacket 16, a thermoplastic jacket such as Hytrel polyester which may be extruded over reinforcing fibers 14. Buffer tube 12 is preferably made with an inner diameter of the order of 50 mils and an outer diameter of the order of 80 mils. For general-purpose cable, outer jacket 16 has a nominal outside diameter of the order of 120 mils. For heavy-duty cable, this can be increased to a nominal outside diameter of 175 mils.

FIG. 2 is a view of a section of cable for the practice of the present invention when the cable is to be manufactured for extra-heavy duty. In FIG. 2 fiber 10, with a nominal outside diameter of 10 mils, fits loosely in buffer tube 12, a HYtrel tube with a nominal inner diameter of 50 mils and a nominal outer diameter of 80 mils. A loose fit is here defined to be a fit that permits relative motion readily while providing structural support. Buffer tube 12 in turn is placed within inner jacket 18, a thermoplastic material such as Hytrel polyester. Inner jacket 18 typically has an outer diameter of the order of 110 mils. It is covered with reinforcing fibers 14 of polyamide, such as Kevlar or the like, and an outer jacket of polyester, such as Hytrel or the like, having a nominal outside diameter of 185 mils, completes the extra-heavy duty cable. It should be understood that the dimensions given here are for purposes of illustration. In FIGS. 1 and 2 fiber 10 is the operating substance for which the invention is designed. Buffer tube 12, reinforcing fibers 14, outer jacket 16, and inner jacket 18 serve to support and protect fiber 10. In addition, buffer tube 12, outer jacket 16, and inner jacket 18 are preferably made of a thermoplastic material that will take a permanent set. This permanent set is applied as shown in FIG. 3 which is a view of a coiled cable ready for heat treatment.

In FIG. 3 mandrel 24 is shown with a number of turns 26 of cable. For the range of dimensions listed above, mandrel 24 should have a diameter of at least $\frac{3}{8}''$, and preferably $\frac{1}{2}''$ or more for multi-mode fibers. Single-mode fibers for optical transmission are preferably wound on a mandrel having a diameter of 1" or more. When a single-mode fiber (not PRSM or DISPERSION SHIFTED-DS) is wound on a mandrel having a diameter less than 1", multi-mode reflection within the fiber causes the cable to become an optical attenuator that varies in attenuation according to the amount that the optical cable is extended.

FIG. 4 is a flow chart showing steps in making the coiled cable of the present invention. The process begins, as shown, in box 30 by insertion of fiber 10 into buffer 12. Step 32 applies only to heavy-duty cable to which an inner jacket 18 is applied. Step 34 indicates the application of reinforcing fibers 14 over buffer 12 of standard cable and over inner jacket 18 of heavy-duty cable. The application of reinforcing fibers 14 has been described as placement in a loose spiral. This is a spiral that projects an angle of 45° or more with the axis of the cable, to provide strength in tension for the cable. In step 36 the buffered and wound fibers are inserted in an outer jacketing of a thermoplastic material. The term "inserting" is here taken to include extrusion as well as the placement of the assembled structure in the hollow tube of thermoplastic material. In step 38 the cable is wound on mandrel 24. A mandrel having a diameter as small as $\frac{3}{8}''$ is effective for multi-mode optical fibers, but better results have been obtained with mandrels ranging in diameter from $\frac{1}{2}''$ to 2". Single-mode fibers (not PRSM) wrapped on a mandrel having a diameter less than 1" exhibit variable attenuation of the optical signal. Accordingly, cables containing single-mode optical fibers that are designed to carry optical signals and not attenuate them are preferably wound on mandrels having a diameter equal to or greater than 1". The cable is wound snugly on the mandrel and is secured in place in step 40 in which the assembly is placed in an oven to set the thermoplastics. Good results have been obtained by treating such assemblies in a circulating air oven for one to two hours at a temperature of 195° F. to 210° F. This time and temperature is a function of the particular properties of the thermoplastic material used and is determined by the specifications of the material. Following step 40, in step 42 the assembly is removed from the oven and cooled. The assembly may be cooled at room temperature or it may be placed in a cold chamber at a temperature such as 25° F. to 35° F. for a time of the order of one hour. When the assembly has reached room temperature, in the next step, step 44, the coiled cable is removed from the mandrel and reverse wound to set the coiled configuration. This is an actual reversal of the direction of winding which causes the cable to assume a more tightly coiled configuration. The cable is now ready for termination and use. Use of the cable as produced above to carry optical signals involves only selection of an appropriate size of optical fiber, termination, and working length. These are conventional considerations for such selection.

When a cable is made as described above with a single-mode optical fiber (not PRSM) and is wound on a mandrel having a diameter of 1" or less, then the cable can be used as a variable attenuator. Any such cable will attenuate an optical signal when the cable is coiled and not pulled essentially straight. However, if it is desired to have an optical attenuator with input and output terminals that are reasonably close together with attenuation that can be set, then it is desirable to support the cable and to maintain some measure of its extension, which is a measure of its attenuation. The attenuation is essentially inversely proportional to the extension of the coiled cable. It is maximum when the cable is tightly coiled and is minimum, approaching zero, when the cable is pulled to its maximum extension. While a cable may be dangled or loosely supported to serve as an attenuator, it is preferable to use a supporting structure for such an attenuator. FIG. 5 is an example of a supporting structure that comprises a variable optical attenuator.

In FIG. 5 a base 50 supports a shelf 52 that is movable with respect to base 50. A terminal block 54 contains a pair of terminals 56 and 58. Coiled cable 60 is connected at its ends to terminals 56 and 58 and is placed in shelf 52 so that it goes around barrier 62. Thus, when shelf 52 is moved with respect to base 50 as indicated by the arrows, the length of coiled cable 60 is varied, varying the optical attenuation. A measure of the attenuation can be had from indicator 64, which provides a measure of the extension of shelf 52 and hence of the attenuation supplied by the chosen length of coiled cable 60.

The coiled cable of the present invention has shown excellent mechanical strength and provides better protection for optical fibers than conventional flexible cables.

A specific embodiment of the fiber optic coil cord has been described for purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention any and all modifications, variations or equivalents that fall within the true spirit and scope of the basic principles disclosed and claimed herein.

What is claimed is:

1. A coiled optical cable comprising:
   (a) an optical fiber;
   (b) a hollow cylindrical, flexible buffer tube sized to make a loose fit with the optical fiber and enclosing and containing the optical fiber, said buffer tube permitting relative motion of the optical fiber enclosed therein;
   (c) a plurality of flexible reinforcing fibers wound in an open helix about the buffer tube;
   (d) a flexible outer jacket surrounding and enclosing the reinforcing fibers; and,
   (e) said cable of optical fiber, buffer tube, reinforcing fibers, and outer jacket having the structure of a closed helix in a tightly coiled configuration having a permanent set.

2. The cable of claim 1 wherein the optical fiber is step-index fiber that is clad with glass having a refractive index different from a refractive index of the optical fiber.

3. The cable of claim 1 wherein the optical fiber is optical glass having an index of refraction that varies continuously from a maximum index of refraction on and near the axis of the optical fiber to a different value radially outward from the axis.

4. The cable of claim 1 wherein the optical fiber is single-mode fiber.

5. The cable of claim 1 wherein the optical fiber is multi-mode fiber.

6. The cable of claim 1 wherein the optical fiber is multi-mode graded-index fiber.

7. The cable of claim 1 wherein the plurality of reinforcing fibers comprises from 4 to 6 reinforcing fibers.

8. The cable of claim 1 wherein said closed helix in a tightly coiled configuration has an inner diameter of at least about 3/8 inch.

9. The cable of claim 1 wherein said closed helix in a tightly coiled configuration has an inner diameter of from about ½ inch to about 2 inch.

10. The cable of claim 1 wherein said closed helix in a tightly coiled configuration has an inner diameter of at least about one inch.

11. The cable of claim 1 wherein said optical fiber is single-mode step-index fiber.

12. The cable of claim 2 wherein said step-index fiber is selected from the group consisting of a silica glass and a transparent plastic.

13. A method of making a coiled optical cable comprising the steps of;
   a. placing an optical fiber in a hollow cylindrical buffer tube of a thermoplastic material sized to make a loose fit with the optical fiber and to permit relative motion of the optical fiber therein;
   b. winding a plurality of reinforcing fibers in an open helix about the buffer tube;
   c. disposing an outer jacket of a thermoplastic material to cover the plurality of reinforcing fibers and thereby form a cable;
   d. winding the cable in a tight helix on a mandrel;
   e. heating the mandrel and wound cable to a temperature that softens the thermal plastic material;
   f. cooling the cable and mandrel to room temperature;
   g. removing the mandrel from the coiled cable; and
   h. reverse winding the coiled cable.

14. The method of claim 13 wherein the optical fiber is single-mode step-index fiber.

15. The method of claim 13 wherein the optical fiber is multi-mode graded-index fiber.

16. The method of claim 13 wherein the buffer tube is disposed within a thermal plastic inner jacket and wherein the plurality of reinforcing fibers is wound in an open helix on the inner jacket.

17. The method of claim 13 wherein the mandrel has a diameter equal to or greater than about ⅜ inch.

18. The method of claim 10 wherein the step of heating the coiled cable on the mandrel comprises placing the coiled cable and mandrel in an oven at a temperature of about 195° F. to 210° F. for about one to two hours.

19. The method of claim 13 wherein the step of cooling the mandrel and coiled cable to room temperature comprises placing the mandrel and coiled cable in a chamber at about 25° F. to 30° F. for approximately one hour; removing the coiled cable and mandrel from the chamber; and placing the mandrel and coiled cable in a location at ambient temperature until the mandrel and coiled cable reach ambient temperature.

20. A variable optical attenuator comprising:
   a. a fiber optic coiled cord having a single-mode silica fiber, the coiled cord wound on a mandrel having a diameter less than one inch;
   b. means for supporting the fiber optic coiled cord in a horizontal plane; and
   c. means for varying the extension of the supported fiber optic coiled cord.

21. The apparatus of claim 20 comprising in addition a terminal block containing two optical cable terminals, one of each of the terminals connected to an end of the fiber optic coiled cord.

* * * * *